March 30, 1926. 1,578,463
E. E. NICHOLSON ET AL
PROCESS OF MANUFACTURING BEET SUGAR
Filed Oct. 6, 1924
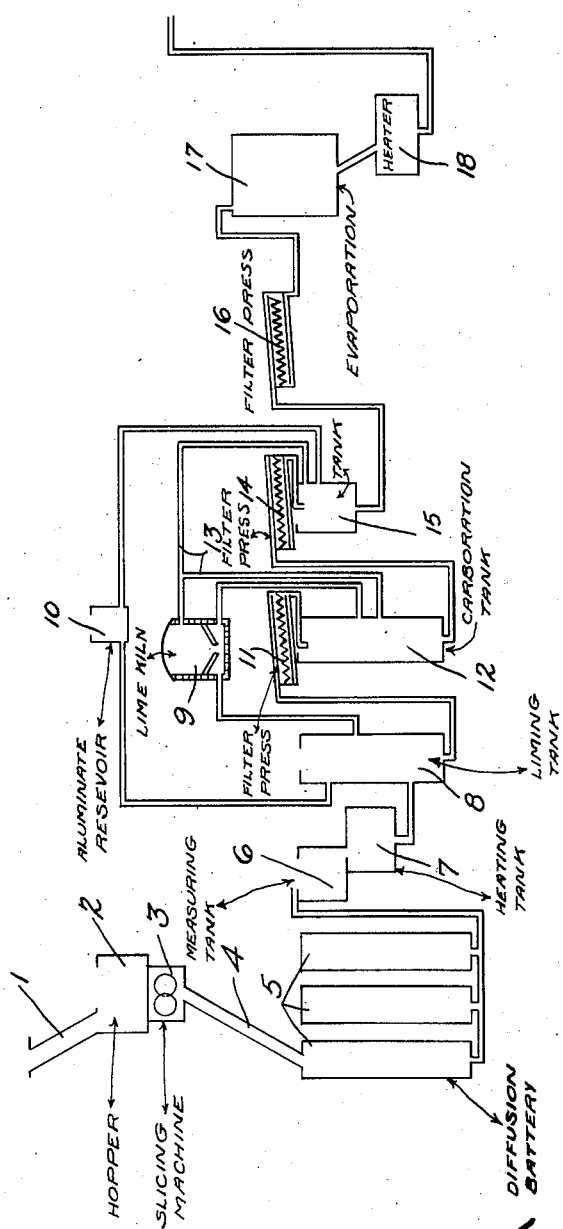
INVENTORS
EDWARD E. NICHOLSON
RALPH B. BEAL
BY THEIR ATTORNEY
James F. Williamson Patented Mar. 30, 1926.

1,578,463

UNITED STATES PATENT OFFICE.

EDWARD E. NICHOLSON AND RALPH B. BEAL, OF MINNEAPOLIS, MINNESOTA.

PROCESS OF MANUFACTURING BEET SUGAR.

Application filed October 6, 1924. Serial No. 741,872.

*To all whom it may concern:*

Be it known that we, EDWARD E. NICHOLSON and RALPH B. BEAL, citizens of the United States, residing at Minneapolis, in the county of Hennepin and State of Minnesota, have invented certain new and useful Improvements in Processes of Manufacturing Beet Sugar; and we do hereby declare the following to be a full, clear, and exact description of the invention, such as will enable others skilled in the art to which it appertains to make and use the same.

This invention relates to an improved process in the manufacture of sugar and while the invention is also applicable to the process of manufacturing cane sugar, it is particularly designed for use in the manufacture of sugar from sugar beets.

At present, the manufacture of beet sugar is practically standardized, although there are some slight variations in the various factories. One process, at present employed, may be briefly described as follows:—

The sugar beets, after being properly cleaned and cut into thin slices, called "cosettes", are immersed in warm water, the sugar diffusing through the cell walls of the root into the water, which operation is carried out in a series of tanks called a "diffusion battery" arranged in a circle and connected together. The juice passes continuously in circulation throughout these tanks growing continuously richer in sugar. After leaving the diffusion battery, the juice is treated with quantities of caustic lime, which treatment is operative to neutralize and precipitate the organic acids present. A small amount of carbon dioxide is usually added at this time to decrease the excess of lime, but since some of the impurities precipitated are only insoluble in alkaline solutions, the first treatment of carbon dioxide is stopped, while there is still an abundance of caustic lime present. Otherwise the reaction would be reversible. The substance is then passed through a filter press and a second carbonation reduces the amount of free lime precipitating calcium carbonate, magnesium and iron carbonates and other insoluble carbonates, but still leaving traces of the free lime in solution, and also necessarily leaving considerable amounts of acid carbonates in solution. The mass is then again filtered and is often subjected to sulphur dioxide fumes to remove the alkalinity in the solution. This step, however, is not always employed. After a third filtration, the juice is usually evaporated, at low temperature first, in a series of multi-tubular evaporators and then, after being heated at atmospheric pressure, is further sulphured and filtered and the evaporation concluded in steam heated vacuum pans. In the vacuum pans or boiling pans, crystallization of the sugar is slowly effected and the sugar then goes through the centrifugals in which the crystallized sugar is separated. This sugar is then dried and conveyed to the granulators, where it is sifted and then bagged for commercial use.

There are two outstanding objections to this present process as above described. First, there is always considerable difficulty in forcing the juice through the filter presses after liming and carbonation, because of the nature of the precipitates obtained. The usual precipitates in the process, as hitherto used, are not sufficiently coarse or granular to allow the liquid to readily pass through the filter press and are often gummy or sticky. The second objection is that, after the second carbonation, not only is free caustic lime necessarily left in the solution, but large amounts of undesirable acid carbonates, such as calcium acid carbonate and magnesium, iron and other soluble carbonates still remain. These acid carbonates, as well as the excess lime in solution, collect on the walls of the evaporating tanks, vacuum pans and the hot pipes through which said juice passes and is heated, and form a hard incrustation or scale thereon, greatly reducing the capacity and efficiency of the said parts. The result is that considerable time must necessarily be spent in removing this scale, during which these important parts of the apparatus must remain idle, thereby decreasing the output of the plant materially.

It is the main object of this invention to provide an improved method of manufacturing beet sugar, which will overcome the above stated objections to the process hitherto used.

More specifically, it is an object of the invention to treat the juice after the liming with sodium aluminate or other water solvent aluminates, whereby a portion of the excess of lime may be removed together with the precipitated organic acids in the form of a coarse granular precipitate of flocculent or irregular form, which is especially adapted to permit the juices to be readily forced therethrough and through the filter press. The precipitate, effected by the use of sodium aluminate or other water solvent aluminates, has been tested and found to materially increase the speed and efficiency of filtration, preventing the filter presses from becoming clogged and coagulating many of the organic substances, which, in the process hitherto used, often are precipitated in a sticky or finely divided mass.

A further object of the invention is to add to the filtered juice, after the last carbonation, further quantities of sodium aluminate to remove the last traces of lime in the solution and to break up the several soluble acid carbonates present therein, thus preventing the objectionable scaling on the tanks and pipes of the evaporators and vaccum pans. The sodium aluminate removes practically all of these objectionable elements precipitating the same and permitting them to be collected and thrown out in the next filtering step.

To these ends, generally stated, the invention consists of the novel process herein described and set forth in the claims.

The process may be carried out by any suitable apparatus, but, in order to make the disclosure of the process more distinct, an apparatus suitable for carrying out the novel process is briefly diagrammed in the accompanying drawing.

In carrying out the process of the invention, the beets having been cleaned and weighed, are dropped through a chute 1 into a hopper 2 which feeds the slicing machine 3 provided with rotary cutters. The sliced beets pass through the chute 4 into the several tanks 5 of the battery and provision is made for unloading the sliced beets into the several tanks (not shown). Warm water is run over the sliced beets or "cosettees," successively causing diffusion of the juices containing the sugar. The juice passes from the battery to a measuring tank 6 and from there to the tank 7, where the juice is heated and passed to the liming tank 8. Here under agitation, either by the steam in said tank, or by mechanical means, quantities of lime are run into the liming tank 8 from the lime kiln 9. The organic acids are precipitated and, after sufficient liming has taken place, small quantities of sodium aluminate or some other water solvent aluminate are introduced into the tank 8 from the reservoir 10. The sodium aluminate is added during agitation of the liquids within tank 8 and precipitates a portion of the lime in the calcium aluminate also precipitating small amounts of magnesium, iron or other soluble hydroxides in solution. These precipitates formed have the peculiar characteristic of being made up of a plurality of coarse granular particles of flocculent shape. In the liming tank 8, before the sodium aluminate is admitted, it may be desirable to admit a small quantity of carbon dioxide, although, preferably, this step is omitted. From the liming tank, the mass passes into the first filter press 11, where the precipitates are filtered out and the clear juice admitted to the carbonation tank 12. The coarse irregular flakes of the precipitate produced permit a ready passage of the juice through the filter press. There is still present an excess of lime in the resulting filtrate, since this is necessary to prevent a reversal of the chemical reaction and also to prevent the sugar from breaking down into its components, glucose and fructose, during the further process. In tank 12, large amounts of carbon dioxide, produced in the burning of the lime in the lime kiln tank, are introduced passing through the pipes 13 into the juice in tank 12 and precipitating large amounts of calcium carbonate and smaller amounts of magnesium, iron and other insoluble carbonates. The alkalinity of the solution is, of course, greatly reduced by the addition of the carbon dioxide. The liquid is then again filtered through the filter press 14, admitting the filtrate to the tank 15.

The juice admitted to tank 15 contains traces of the lime as well as considerable amounts of the several acid carbonates necessarily formed in the carbonation process just described. These acid carbonates, as well as the excess of lime, will collect and harden forming a hard scale on the tanks and pipes in the evaporators and driers through which the juices pass later in the refinement. Considerable quantities of sodium aluminate are admitted to the tank 15 from the reservoir 10, which precipitate the acid carbonates and also remove the remaining traces of lime from the solution. By adding an excess of the sodium aluminate, practically all of these undesirable scale-forming chemicals are removed from the solution and the liquid passes through the filter 16 into the evaporator 17 and through the heater 18. Before entering the evaporator 17, it is preferable to treat the liquid with sulphur dioxide fumes to remove the alkalinity caused by the sodium hydroxide left in solution after the sodium aluminate was added in tank 15. This step may, however, be carried out after the liquid has gone through the first evaporation tank. The sulphur dioxide not only neutralizes the alkalinity but also is instrumental to bleach the sugar. The juice is further evaporated, crystallized and dried in the customary way by means not shown in the drawing.

The proportion of the sodium aluminate admitted in tank 8 will vary from one-tenth to three-fourths of a pound of 25% solution of sodium aluminate to the thousand gallons of the juice, depending upon the solution of caustic lime in this tank.

The amount of sodium aluminate admitted in tank 15, where the acid carbonates and excess of lime are removed, varies from one-fourth to one and one-half pounds of 25% solution of sodium aluminate to the thousand gallons of liquid within this tank, depending, of course, on the condition of the juice when the sodium aluminate is admitted. The best results are obtained within the range of these proportions.

From the above description, it will be seen that a novel and improved process has been invented, which does away with some of the most outstanding disadvantages in the present day manufacture of beet sugar.

In the tank 8, a portion of the excess of lime is removed and the character of the precipitate is materially changed from that of the old process hitherto used, towit: a coarser and more porous and brittle precipitate is effected, which will more readily permit filtration of the juices therethrough.

The objectionable scaling and incrustation of the several heated tanks, evaporators, vacuum pans and heated pipes have been obviated by the application of the sodium aluminate in the process, after carbonation and filtration of the juice.

The employment of this process, therefore, results in not only an improved product but in a substantial increase in the daily output of the plant, speeding up filtration and obviating the necessity for the cleaning of the parts of the apparatus in which scaling is today present.

It is to be understood that other water soluble aluminates may be employed or substituted for the sodium aluminate with effective results, although sodium aluminate is preferred, because it is cheaper and more easily obtained.

It will, of course, also be understood that the process may be carried out by any other suitable apparatus and also that various changes may be made in the steps and sequence of the same in this process.

What we claim is:—

1. The process of manufacturing sugar which comprises extracting the juice from the raw products, treating said juice with an excess of caustic lime, adding a quantity of water soluble aluminate to precipitate portions of the excess of lime and other hydroxides present, for producing floccular and granular precipitates, filtering the resulting mass and treating the filtrate with carbon dioxide, then further filtering said juice.

2. The process of manufacturing sugar which comprises adding a quantity of water soluble aluminate to the juice from the raw materials after said juice has been treated with caustic lime and carbon dioxide, whereby the remaining traces of lime and other hydroxides as well as the soluble acid carbonates present in solution after said last two named steps will be precipitated, and filtering the resulting liquid therefrom.

3. The process of manufacturing sugar which comprises extracting the juice from the raw products, treating said juice with caustic lime, adding a quantity of water soluble aluminate, filtering the liquid, treating the filtrate with carbon dioxide and again filtering, then adding a quantity of water soluble aluminate to said last named filtrate, and again filtering the juice.

4. The process of manufacturing beet sugar which comprises extracting the juice from the sugar beets, treating said juice under agitation with an excess of caustic lime, adding a quantity of water soluble aluminate to the solution after sufficient working of the lime to remove a portion of the excess of lime and other hydroxides present for producing a coarse flocky and granular precipitate adapted to permit speedy and efficient filtration, passing the juice through a filter press and treating the filtrate with quantities of carbon dioxide to precipitate calcium carbonate and other carbonates, again filtering the solution to remove the carbonate and other precipitates, and adding a quantity of water soluble aluminate to the filtrate to remove the remaining traces of lime and precipitate the acid carbonates formed in said last named step and again filtering.

5. A step in the process of manufacturing sugar which comprises adding quantities of water soluble aluminate to the limed and carbonated juice to remove excess calcium hydroxide and acid carbonates in the form of a coarse granular and flocky precipitate adapted to readily permit passage of the solution therethrough in the filter presses.

In testimony whereof we affix our signatures.

EDWARD E. NICHOLSON.
RALPH B. BEAL.